INVENTORS
Tadeusz Budzich
and Edward V. Manning
BY Dodge and Sons
ATTORNEYS

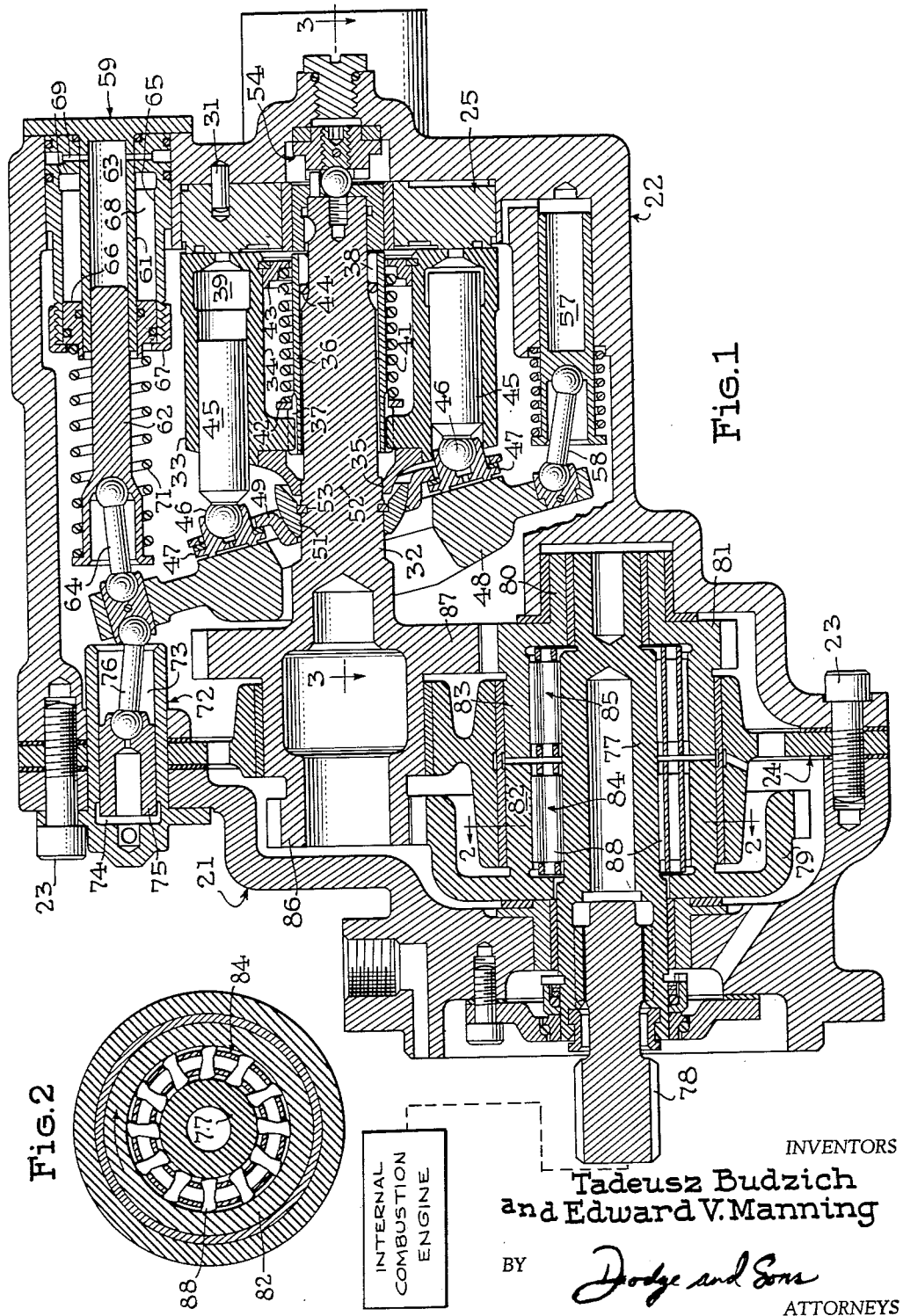
Oct. 27, 1964   T. BUDZICH ETAL   3,153,899
HYDRAULIC STARTING AND PUMPING METHOD AND APPARATUS
Original Filed Jan. 29, 1959   9 Sheets-Sheet 1
INVENTORS
Tadeusz Budzich
and Edward V. Manning
BY Dodge and Sons
ATTORNEYS Oct. 27, 1964   T. BUDZICH ETAL   3,153,899
HYDRAULIC STARTING AND PUMPING METHOD AND APPARATUS
Original Filed Jan. 29, 1959   9 Sheets-Sheet 2

Oct. 27, 1964
T. BUDZICH ETAL
3,153,899
HYDRAULIC STARTING AND PUMPING METHOD AND APPARATUS
Original Filed Jan. 29, 1959
9 Sheets-Sheet 3
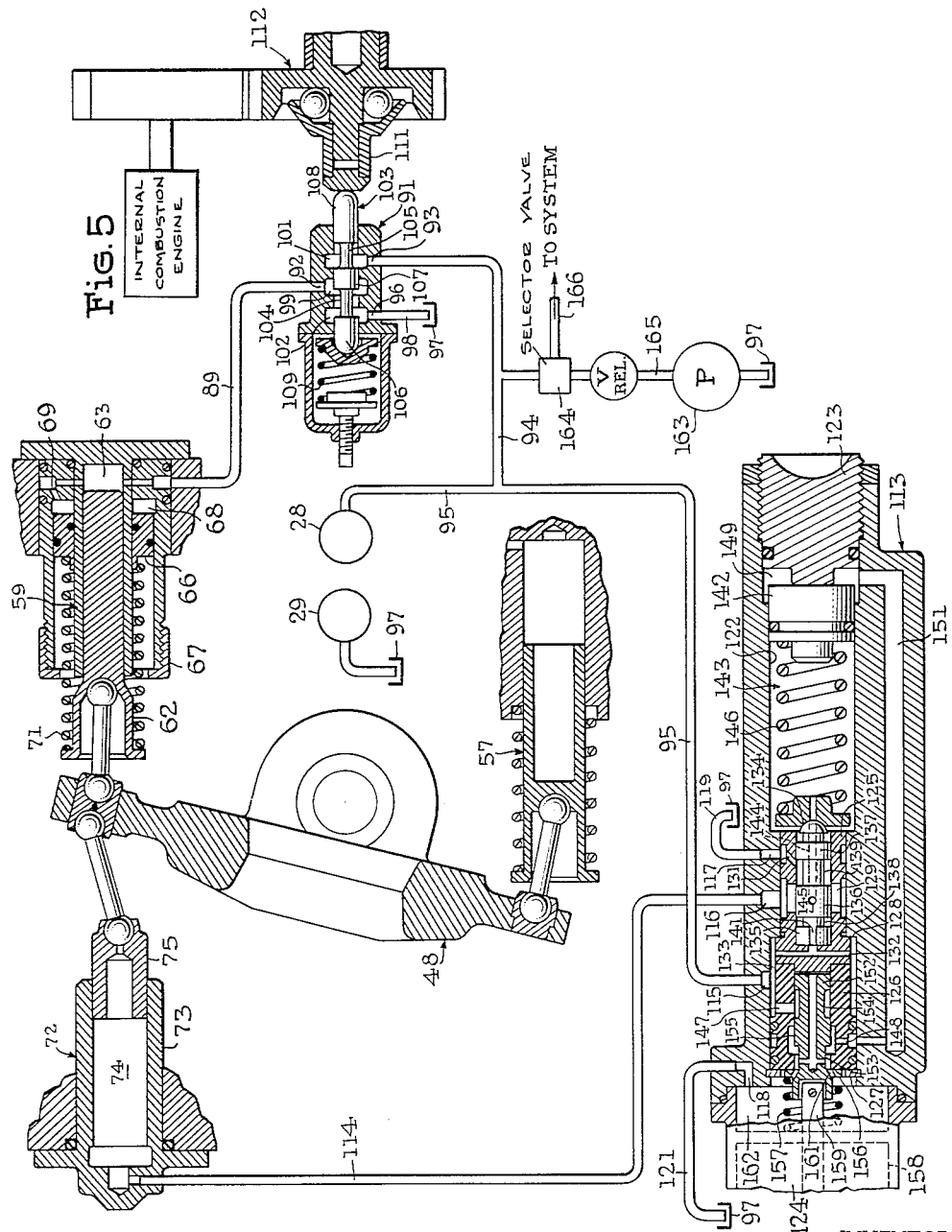
INVENTORS
Tadeusz Budzich
and Edward V. Manning
BY *Dodge and Sons*
ATTORNEYS

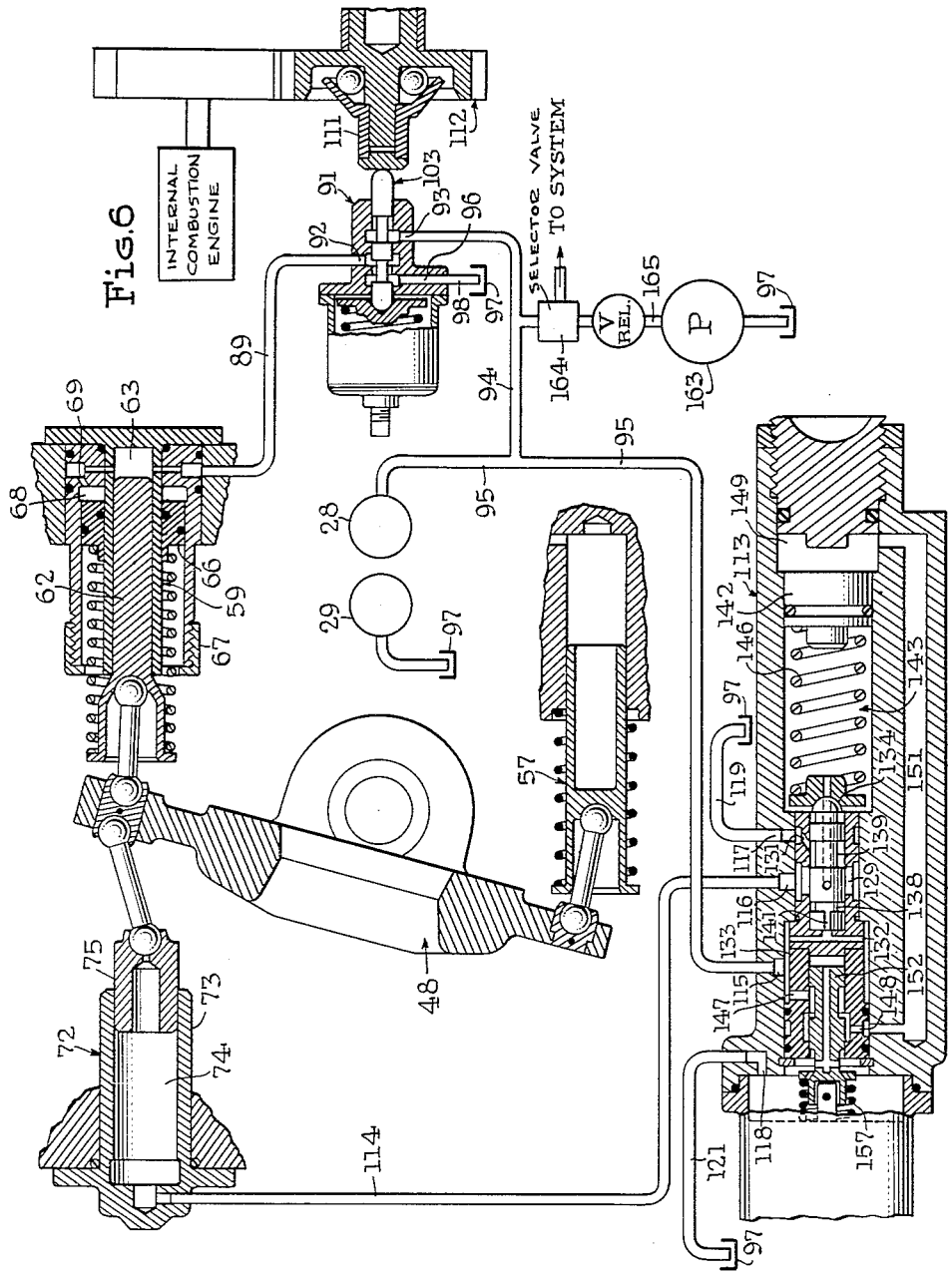

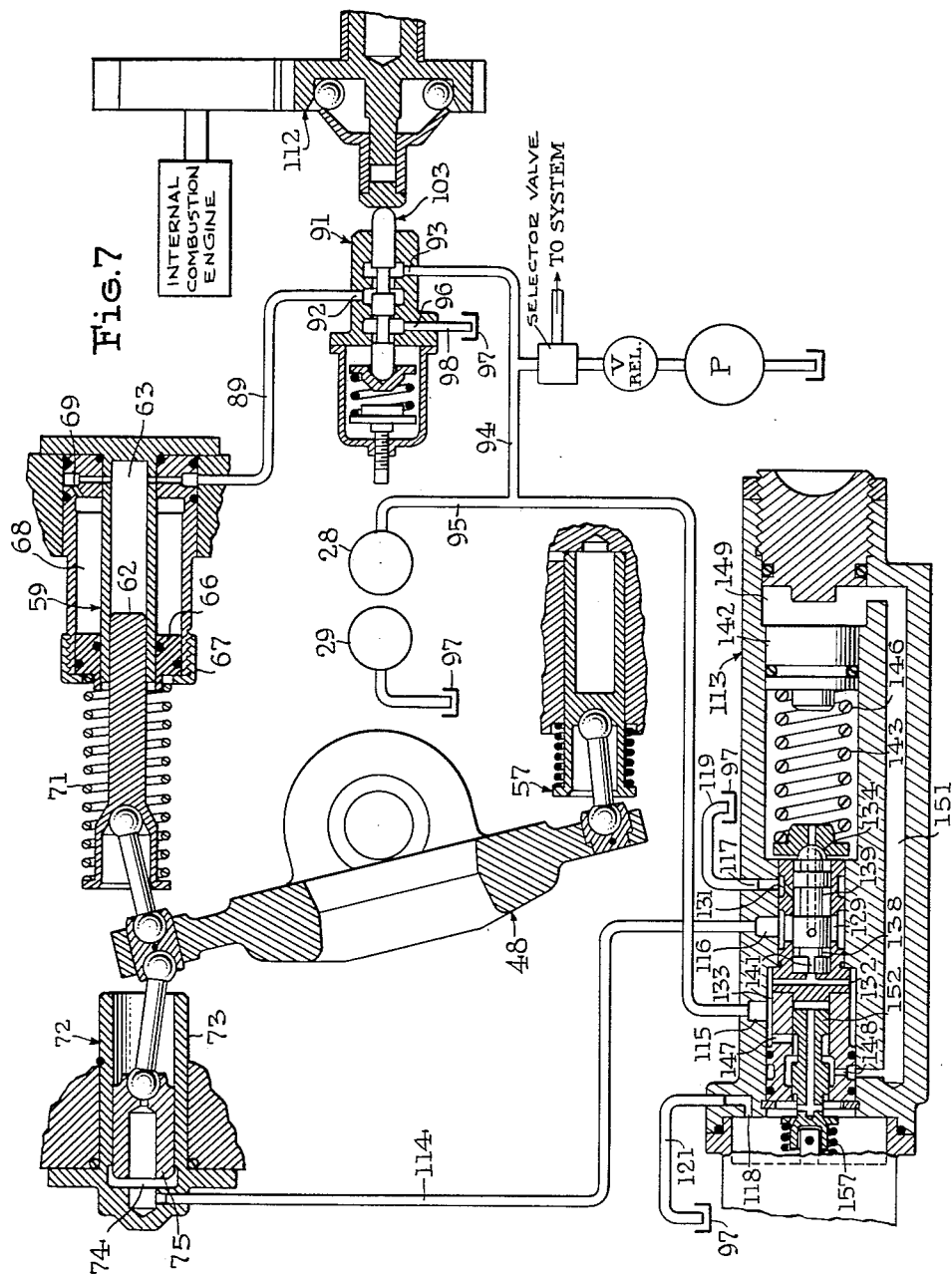

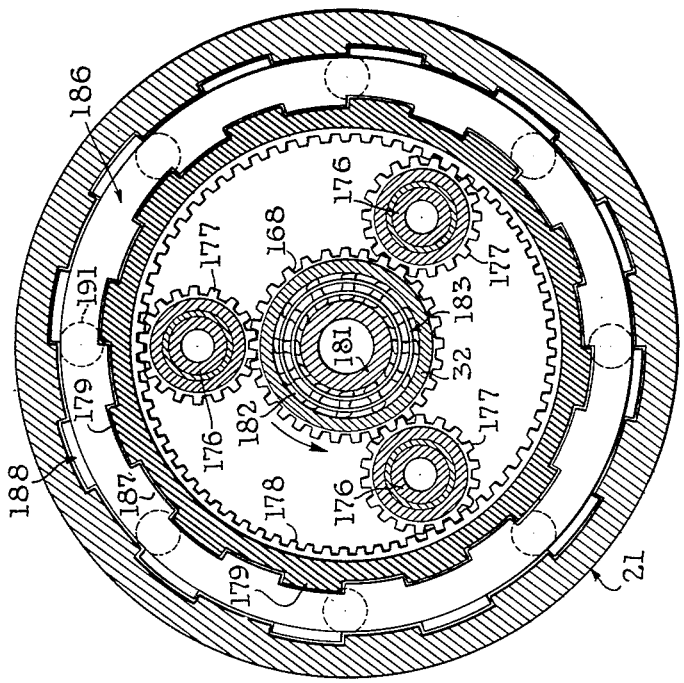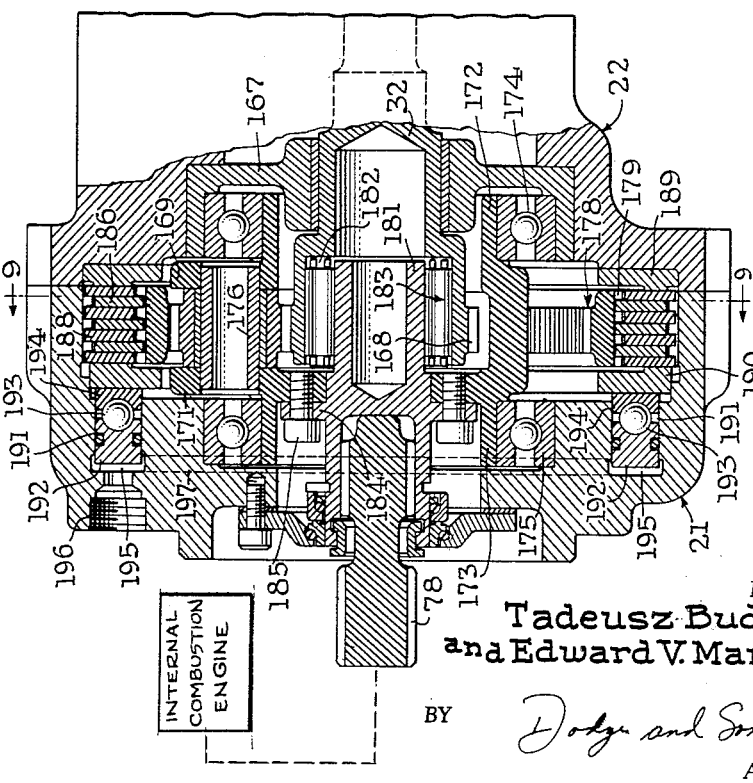

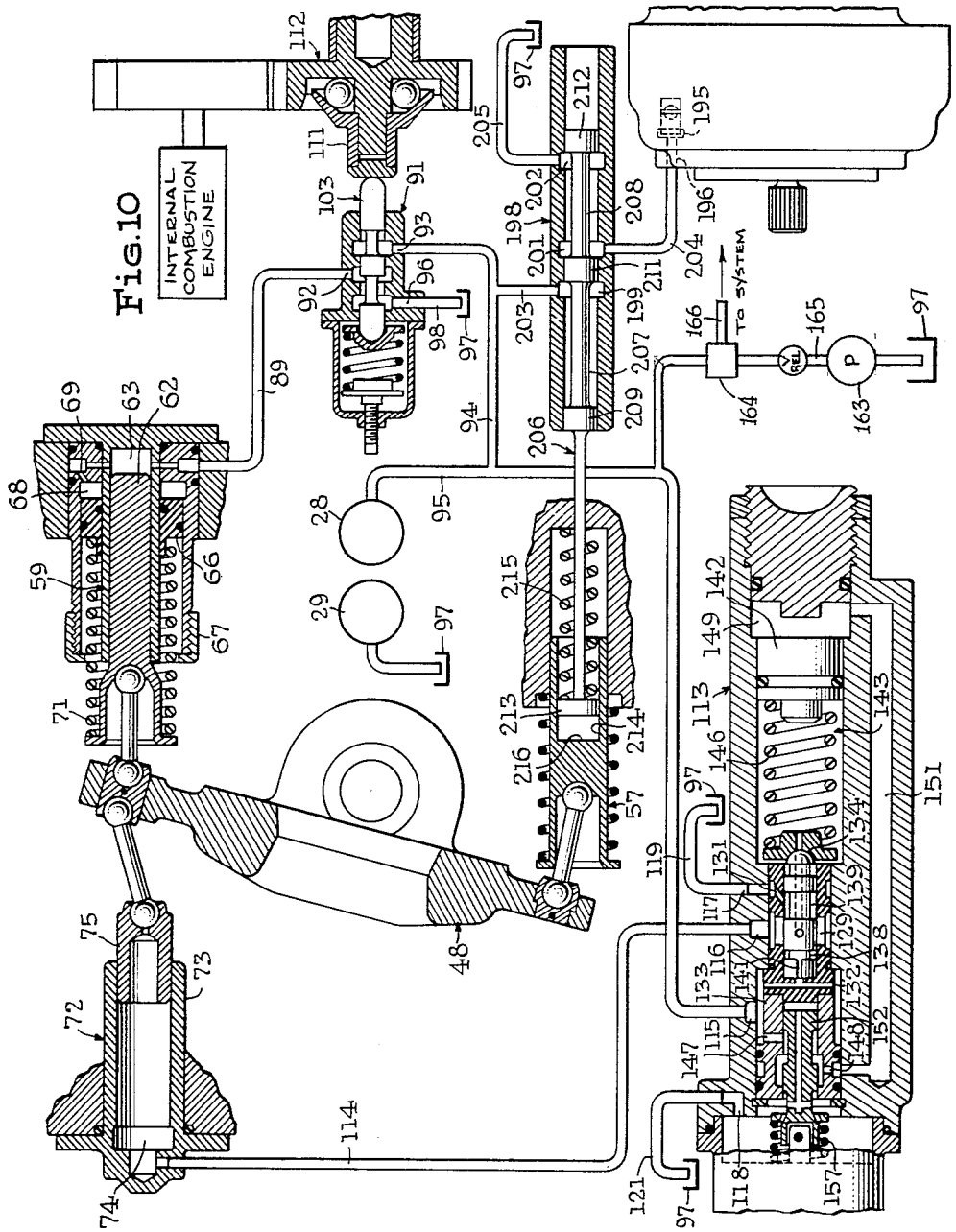

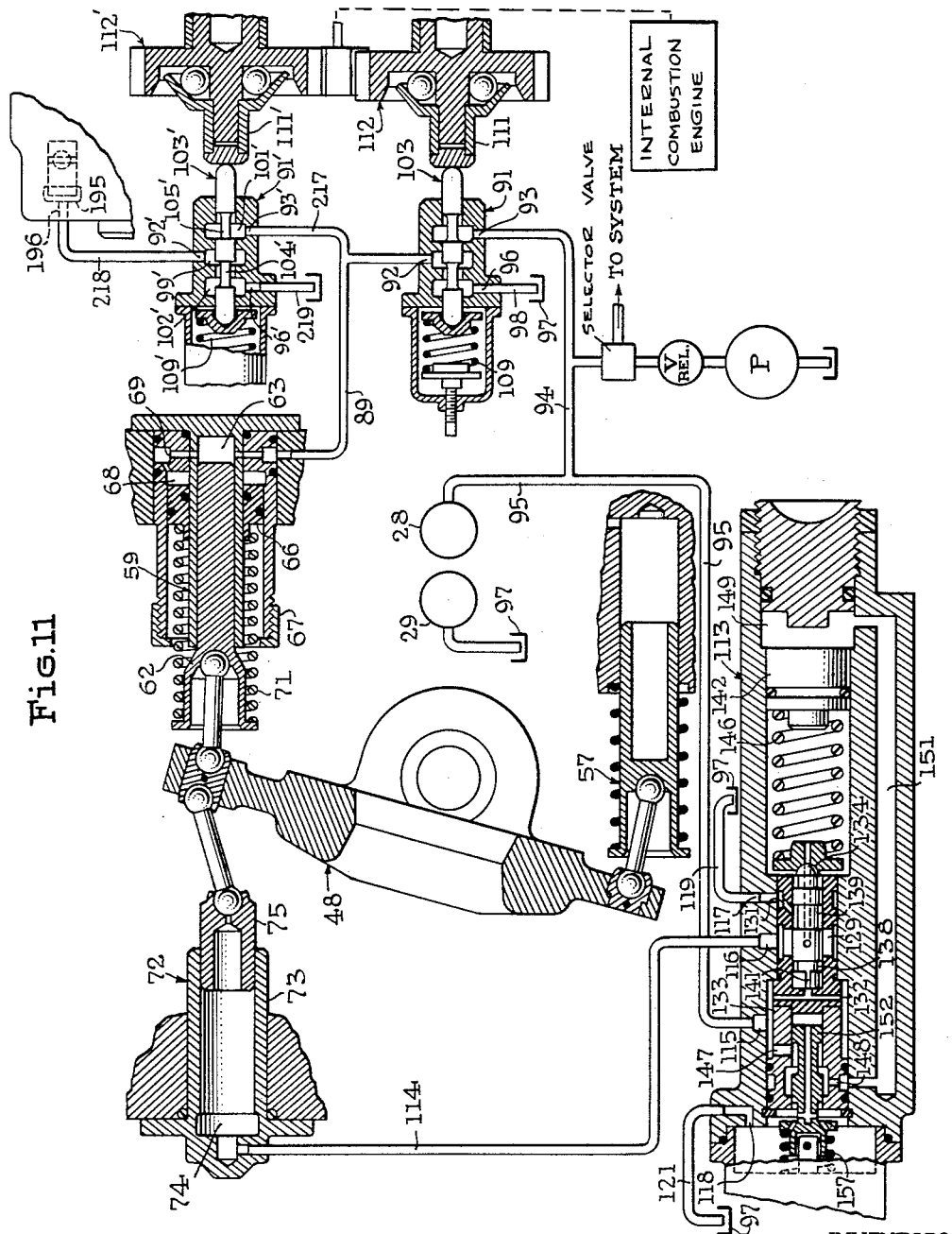

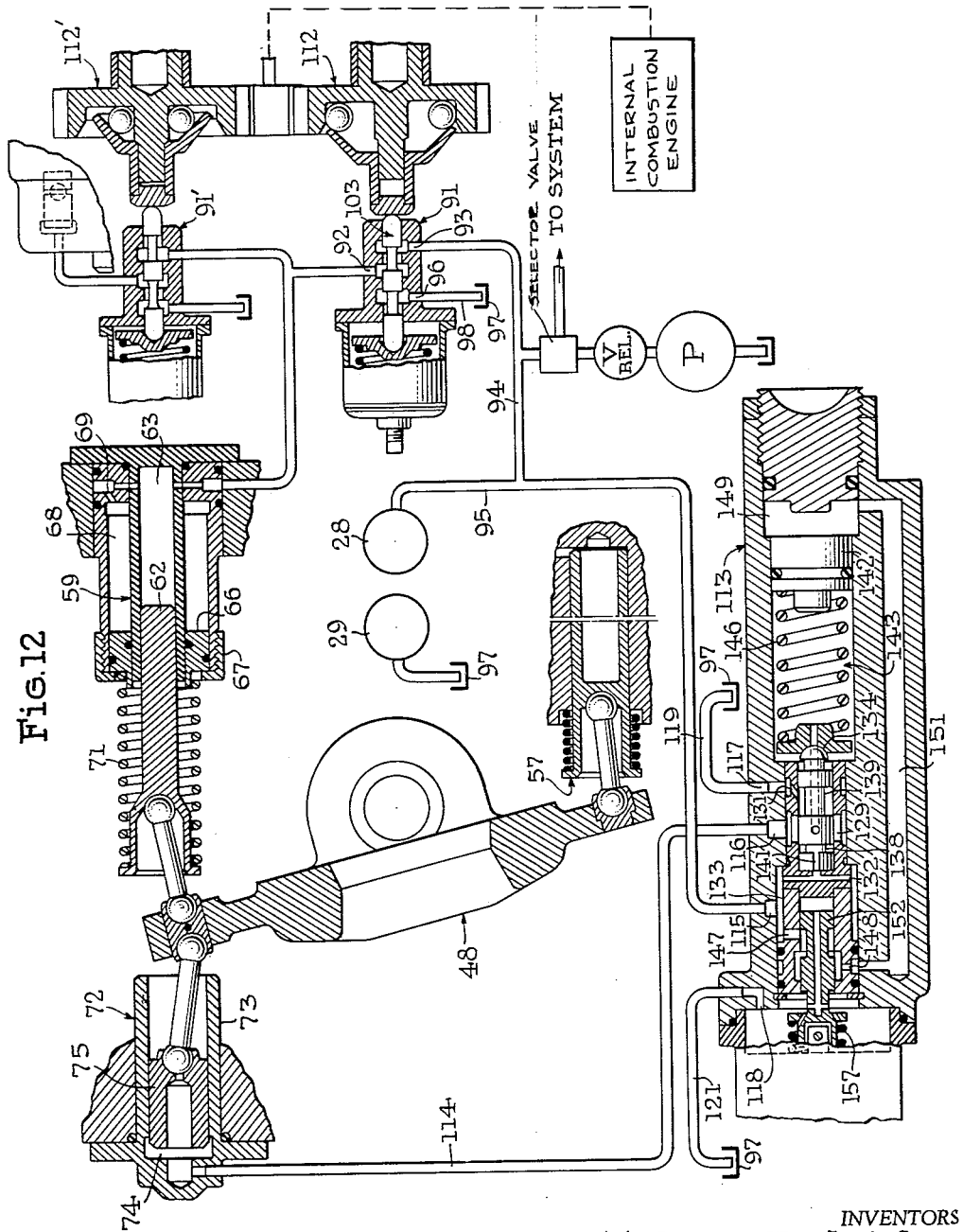

United States Patent Office 3,153,899
Patented Oct. 27, 1964

3,153,899
HYDRAULIC STARTING AND PUMPING
METHOD AND APPARATUS
Tadeusz Budzich, Cleveland, Ohio, and Edward V. Manning, Watertown, N.Y., assignors to The New York Air Brake Company, a corporation of New Jersey
Continuation of application Ser. No. 789,996, Jan. 29, 1959. This application Mar. 12, 1962, Ser. No. 180,927
24 Claims. (Cl. 60—18)

This invention relates to starting devices for internal combustion engines. This application is a continuation of Serial No. 789,996, filed January 29, 1959, now abandoned.

In many vehicles, especially airplanes, it is necessary to provide a motor for starting the propulsion engine and a hydraulic pump driven by the engine for supplying pressure fluid to the various power-operated devices carried by the vehicle. In the past, several different types of starters have been employed; for example, electric motors, fuel-air combustion turbines, air turbines and solid propellant turbines. In each of these cases, with the possible exception of the electric motor, the starter and its associated circuitry performed no useful function once the propulsion engine had been started. This resulted in an inefficient utilization of space within and contributed unnecessarily to the weight of the vehicle.

The object of this invention is to provide a hydraulic starting device or engine which functions as both a motor and a pump. In this way, the starting and pumping systems are integrated and space, weight and complexity are minimized.

The preferred embodiment of the invention, and several alternate arrangements will now be described in detail with reference to the accompanying drawings, in which:

FIG. 1 is an axial sectional view of the hydraulic pump/motor unit showing the cam plate in its maximum stroke establishing position on the pumping side of neutral; in this figure the bi-directional torque transmitting device has been rotated into the plane of section.

FIG. 2 is a sectional view taken on line 2—2 of FIG. 1 showing the structure of one of the one-way overrunning clutches.

FIG. 5 is a diagram, partly is schematic form, showing the control system for the hydraulic pump/motor unit; the parts being shown in the positions they assume when the hydraulic unit is at rest.

FIG. 6 is a control system diagram similar to FIG. 5 but showing the parts in the positions they assume during the motoring operation.

FIG. 7 is a control system diagram similar to FIGS. 5 and 6 but showing the parts in the positions they assume during the high pressure pumping operation.

FIG. 8 is an axial sectional view of an alternate bi-directional torque transmitting device.

FIG. 9 is a sectional view taken on line 9—9 of FIG. 8.

FIG. 10 is a diagram, partly in schematic form, showing one control system which can be used with the bi-directional torque transmitting device of FIG. 8; the parts being shown in the positions they assume during the motoring operation.

FIG. 11 is a diagram, partly in schematic form, showing another control system which can be used with the bi-directional torque transmitting device of FIG. 8; the parts being shown in the positions they assume during the motoring operation.

FIG. 12 is a control system diagram similar to FIG. 11 but showing the parts in the positions they assume just after the "starter cut-out" speed has been exceeded.

Figure 3:
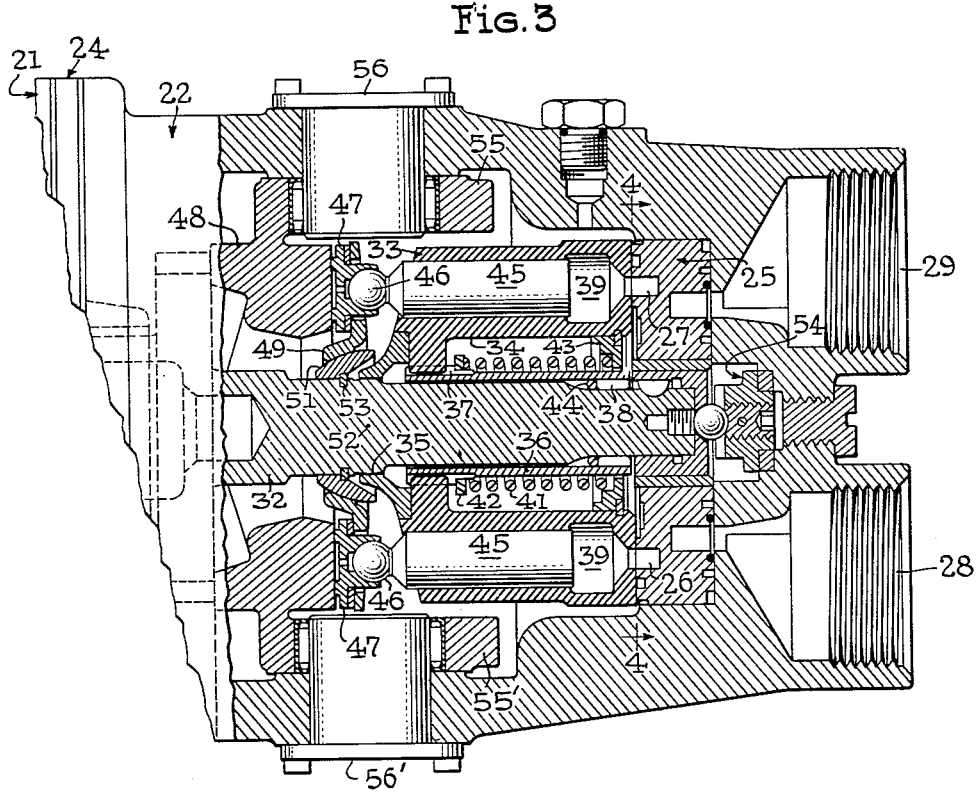
FIG. 3 is a sectional view taken on line 3—3 of FIG. 1.
Figure 4:
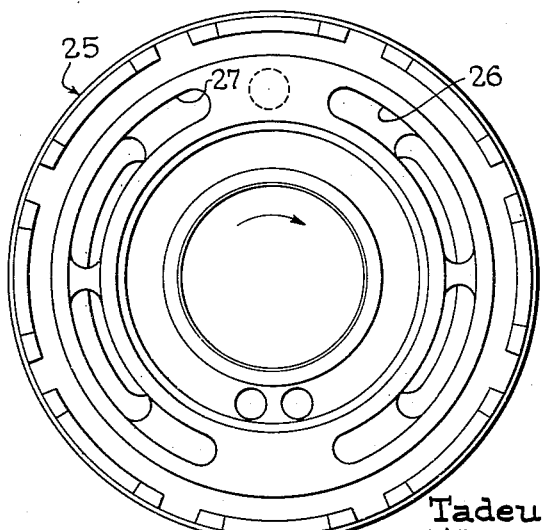
FIG. 4 is a sectional view taken on line 4—4 of FIG. 3 showing the front face of the valve plate.

As shown in FIG. 1, the hydraulic pump/motor unit comprises a housing having separable sections 21 and 22 which are connected together by bolts 23 and which, when assembled, locate and rigidly hold an intermediate wall 24. A valve plate 25, containing arcuate high and low pressure ports 26 and 27 (see FIGS. 3 and 4) which communicate with the high and low pressure ports 28 and 29 of the hydraulic engine, is freely seated within a bore formed in housing section 22 and is prevented from rotating by pin 31. The valve plate disclosed and claimed in Tadeusz Budzich application Serial No. 677,636, filed August 12, 1957, is suitable for use in this engine. A drive shaft 32 is journalled in intermediate wall 24 and in valve plate 25 for supporting and driving rotary cylinder barrel 33. The cylinder barrel is formed with an axial bore 34 which is in great circle engagement with spherical enlargement 35 carried by shaft 32 for providing a universal and axially slidable support for the cylinder barrel. A torque tube 36, connected by splines 37 and 38 at its opposite ends with the cylinder barrel 33 and with the drive shaft 32, joins these members in driving relationship. This method of supporting and driving the cylinder barrel is fully described and claimed in Tadeusz Budzich application Serial No. 656,574, filed May 2, 1957, now Patent No. 2,925,046, issued February 16, 1960. The cylinder barrel 33 contains a circumferential series of through longitudinal cylinder bores 39 which are arranged to register sequentially with the arcuate ports 26 and 27 as the cylinder barrel rotates. A spring 41, reacting between split ring 42 carried by the torque tube and collar 43 carried by the cylinder barrel, biases the cylinder barrel 33 into engagement with the valve plate 25. The spring load imposed on the torque tube is transmitted to the shaft by splines 38 and ring 44.

Pistons 45, formed with spherical heads 46 for supporting shoes 47, are mounted in cylinder bores 39 for reciprocation by cam plate 48 and nutating plate 49. Nutating plate 49 is seated on a collar 51 having a spherical outer surface which engages a similarly shaped recess formed in the nutating plate. The center of this spherical surface, as well as the center of spherical enlargement 35, is located at the point of intersection 52 of the axis of the drive shaft and the plane of the centers of spherical piston heads 46. Snap ring 53, seated in a groove formed in drive shaft 32, prevents longitudinal movement of collar 51 under the action of the piston inertia loads and thus serves to transmit these loads into shaft 32. The loads are conveyed from the shaft to the housing section 22 by thrust bearing 54. This method of handling the inertia forces is fully described and claimed in Tadeusz Budzich application Serial No. 665,387, filed June 13, 1957, now Patent No. 2,953,099, issued September 20, 1960.

Cam plate 48 is supported in housing section 22 by yokes 55, 55' and trunnions 56, 56' for angular movement about an axis extending in a direction normal to the axis of drive shaft 32 and intersecting that axis at the point 52. The angular position of the cam plate determines the length of the strokes of pistons 45 and the cam plate is free to move between maximum stroke establishing positions on opposite sides of a neutral or zero stroke establishing position (a vertical position as viewed in FIG. 1). A spring plunger 57, connected with the lower end of the cam plate 48 by an articulated connecting rod 58, biases the cam plate toward its maximum stroke establishing position on the right or motoring side of neutral. The cam plate 48 is moved to the opposite or pumping side of neutral against the bias of spring plunger 57 by a shifting motor 59. This motor comprises a cylinder 61, a reciprocable piston 62, and a closed motor working chamber 63. The piston 62 is connected with the cam plate by articulated connecting rod 64. Surrounding the cylinder 61 is a coaxial cylinder 65 which defines an annular space for receiving the shiftable spring seat 66. This seat slides along and is in sealing engagement with the surfaces of the cylinders 61 and 65. A cap 67, threaded on the left end of cylinder 65, serves as a stop which limits the leftward movement of spring seat 66. The space 68 to the right of the spring seat 66 is connected with the working chamber of the shifting motor 59 by a passage 69. A biasing spring 71, reacting between the seat 66 and the piston 62, urges the cam plate 48 toward its maximum stroke establishing position on the pumping side of neutral. A control motor 72 comprising a cylinder 73, a working chamber 74, and a reciprocable piston 75 connected with the cam plate 48 by articulated connecting rod 76, serves to shift the cam plate toward its neutral position against the bias of spring 71 and shifting motor 59.

Journalled in housing sections 21 and 22 is a power shaft 77 which is connected with the internal combustion engine (not shown) by a splined coupling 78. Encircling power shaft 77 are two spur gears 79 and 81 whose hubs 82 and 83 are journalled in intermediate housing wall 24. The hub portion 80 of gear 81 is journalled in housing section 22 and supports the right end of power shaft 77. These gears are connected with the power shaft by one-way overrunning clutches 84 and 85 and are arranged to engage spur gears 86 and 87 which are formed as an integral part of drive shaft 32. The cam elements 88 of clutches 84 and 85 are set in reverse senses so that when the shaft 32 is driving the shaft 77, torque is transmitted through gears 86 and 79, and when power shaft 77 is driving drive shaft 32, torque is transmitted through gears 81 and 87. Both gear pairs 79, 86 and 81, 87 effect a step-down in speed; the pair 79, 86 having the higher ratio.

As shown in FIG. 5, the working chamber 63 of the shifting motor 59 is connected by passage 89 with a distributing valve 91. This valve comprises a housing containing an outlet port 92 which is connected with the passage 89, and inlet port 93 which is connected with the high pressure port 28 by passages 94 and 95, and an exhaust port 96 which is connected with a sump 97 by passage 98. These three ports 92, 93 and 96 communicate, respectively, with annular chambers 99, 101 and 102 which are spaced along a valve bore formed in the housing of valve 91. A movable valve plunger 103 is shiftable in the valve bore and is provided with two spaced annular grooves 104 and 105 which define three annular valve lands 106, 107 and 108. The valve plunger 103 is biased to the right to the position shown in FIG. 5 by a spring 109 and is shifted in the opposite direction by the actuator 111 of a centrifugal ball governor 112.

The working chamber 74 of the control motor 72 is connected with a control valve 113 by passage 114. This valve is of the same basic type as the one described and claimed in Tadeusz Budzich application Serial No. 685,-530, filed September 23, 1957, now Patent No. 2,921,-560, issued January 19, 1960. As shown in FIG. 5, it comprises a housing having an inlet passage 115 connected with passage 95, a motor passage 116 connected with passage 114, and two exhaust pasasges 117 and 118 which are connected with sump 97 via passages 119 and 121, respectively. The valve housing is formed with a longitudinal bore 122 having enlarged end portions which are closed and sealed by plug 123 and solenoid casing 124, and an intermediate portion which receives two abutting valve sleeves 125 and 126. These sleeves are held in place by snap ring 127 and shoulder 128. The sleeve 125 contains two ports 129 and 131 which communicate, respectively, with passages 116 and 117, and a passage 132 which communicates with inlet passage 115 through an annular groove 133 formed in the outer periphery of sleeve 126. Mounted in valve sleeve 125 is slidable valve plunger 134 carrying annular lands 135, 136 and 137 which are separated by annular grooves 138 and 139. The land 135 contains a longitudinal slot 141 which connects annular groove 138 with passage 132. Slidable in the right end of bore 122 is a spring seat 142 which, with valve plunger 134 and sleeve 125, defines a spring chamber 143. This chamber 143 is in continuous communication with sleeve port 129 via longitudinal and radial passages 144 and 145. A spring 146, reacting between seat 142 and valve plunger 134, biases the plunger to the left into contact with the end wall of sleeve 125.

Valve sleeve 126 contains two ports 147 and 148; the former communicating with inlet passage 115 through annular groove 133, and the latter communicating with the space 149 between plug 123 and seat 142 via passage 151. Reciprocable in sleeve 126 is a valve plunger 152 which is formed with two spaced annular grooves 153 and 154 that define an annular valve land 155. The left end of the plunger 152 is enlarged to form a shoulder 156 and the plunger is biased by spring 157 to a position in which this shoulder abuts the left end of sleeve 126. A solenoid 158, having a movable armature 159 which is connected with plunger 152, is mounted in casing 124 and serves, when energized, to shift the plunger 152 to the left against the bias of spring 157. Passages 161, extending through the shoulder 156, establish continuous communication between groove 153 and the space 162 inside the solenoid casing.

Before describing the operation of the complete starter device, it will be helpful to consider separately the operation of each of its major components. For convenience, these components will be divided into three groups: the rotating group, comprising drive shaft 32, torque tube 36, cylinder barrel 33, pistons 45, and nutating plate 49; the motor-to-pump conversion group comprising cam plate 48, shifting motor 59, spring 71, distributing valve 91, and centrifugal governor 112; and the discharge pressure compensator group comprising cam plate 48, control motor 72, spring 71, shifting motor 59, and control valve 113.

When cam plate 48 is on the right side of neutral (as shown in FIG. 5), the high pressure fluid delivered to port 28 from pump 163 flows into those cylinder bores 39 which are in communication with arcuate port 26 and forces the pistons 45 against cam plate 48. The reaction force supplied by the cam plate produces a torque on the cylinder barrel 33 which causes the rotating group to rotate in the direction of the arrow in FIG. 4. As the cylinder barrel rotates, the fluid in cylinder bores 39 is discharged through arcuate port 27 and low pressure port 29. The torque developed by the rotating group is delivered to the internal combustion engine by spur gears 86 and 79, clutch 84, power shaft 77, and splined coupling 78. Since the cam elements 88 of clutches 84 and 95 are set in reverse senses, no torque will be transmitted to power shaft 77 through spur gears 81 and 87. After the internal combustion engine has started, it will drive the power shaft 77 in the direction of the arrow in FIG. 2, and when this engine has accelerated to the speed at which power shaft 77 begins to exceed the speed established by gears 79 and 86, the cam elements 88 of clutch 84 will automatically disengage. When power shaft 77 reaches the speed at which gear 81 begins to overrun gear 87, the cam elements 88 of clutch 85 will engage and the internal combustion engine will supply torque for driving the rotating group as a pump.

If the cam plate 48 is in the maximum stroke establishing position of FIG. 5 when clutch 85 engages and the direction of torque transmission between the hydraulic unit and the internal combustion engine reverses, the magnitude of the torque will be large and a severe shock load will be imposed on the gear train and its clutch. Furthermore, since the roating group will be moving in the direction of the arrow in FIG. 4, fluid will be withdrawn from high pressure port 28 and arcuate port 26 and will be discharged under high pressure through arcuate port 27 and low pressure port 29. This reversal of the functions of ports 28 and 29 is obviously undesirable because sump 97 is in direct communication with port 29. The motor-to-pump conversion group functions to reduce the magnitude of the torque at the time of its reversal of direction and also to prevent this port reversal.

At the time the hydraulic pump/motor unit is started, spring plunger 57 will be holding the cam plate 48 in the maximum stroke establishing position on the motoring side of neutral, and working chamber 63 of shifting motor 59 will be vented to sump 97 by passages 89 and 98 and outlet port 92, annular chamber 99, plunger groove 104, annular chamber 102 and exhaust port 96 of distributing valve 91. Since the space 68 to the right of annular spring seat 66 is in communication with working chamber 63 via passage 69, this space will also be vented. When the internal combustion engine has started and reached a speed at which it can accelerate under its own power, the balls of centrifugal governor 112 move to their outermost positions, and actuator 111 will shift plunger 103 of distributing valve 91 to a position in which land 107 interrupts the vent path and plunger groove 105 interconnects inlet and outlet ports 93 and 92. Fluid in passage 94 can now flow to and thus pressurize working chamber 63 and space 68. The speed at which communication between ports 92 and 93 is first established (called the "starter cut-out" speed), must not be greater than, and preferably is less than, the speed at which spur gear 79 begins to overrun spur gear 86. Under the action of the pressure in working chamber 63 and space 68, piston 62 and annular spring seat 66 will move to the left thereby shifting the cam plate 48 toward neutral and compressing spring 71. The spring 71 and the piston 62 are capable of moving the cam plate to its maximum stroke establishing position on the pumping side of neutral but, as will appear below, at this point in the operation they simply move it to neutral and hold it in that position.

As the cam plate 48 moves toward its neutral position, the torque developed by the hydraulic unit, and consequently the speed at which it is capable of driving the internal combustion engine, decreases. When the cam plate is within a few degrees of neutral, spur gear 79 will begin to overrun spur gear 86 and the cam elements 88 of clutch 84 will disengage. Simultaneously, or approximately simultaneously, spur gear 81 will begin to overrun spur gear 87 and the cam elements 88 of clutch 85 will engage. At the time of this reversal of the direction of torque transmission, the magnitude of the torque will be quite small. Furthermore, since the cam plate will be in its neutral position when the hydraulic unit is being driven as a pump, the functions of the ports 28 and 29 will not be reversed.

The components in the discharge pressure compensating group function, when the hydraulic pump/motor unit is operating as a pump, to maintain the cam plate 48 in its maximum stroke establishing position until discharge pressure reaches a limit very close to the desired maximum and then, as the discharge pressure increases above this limit, they serve to move the cam plate 48 progressively toward its neutral position. When the desired maximum pressure is reached, piston stroke, and consequently pump displacement, will be zero. Since this hydraulic unit may, in vehicles having multiple propulsion engines, be used to provide the motive fluid for operating starter devices associated with other engines and since it is desirable, from the standpoint of conserving size and weight, to use a higher pressure when the hydraulic unit is operating as a motor than when it is operating as a pump, the compensator group provides a selection between two maximum pressures.

Although the control motor 72 performs a useful function when the cam plate 48 is on the motoring side of neutral and is moving toward neutral, for present purposes its operation will be described only with reference to the conditions which arise when the cam plate is on the pumping side of neutral. As shown in FIG. 5, the working chamber 74 of this motor 72 is normally vented by passage 114, motor passage 116, port 129, plunger groove 139, port 131, exhaust passage 117, and passage 119. The pressure in passage 95 is transmitted through inlet passage 115 and groove 133 to the passage 132 of control valve 113 where it acts upon the end of the valve plunger 134 and urges this plunger to the right against the bias of spring 146. The preload in spring 146, which determines which maximum pressure will be established, depends upon the position of valve plunger 152. When the solenoid 158 is energized and the plunger 152 has moved to the left (as shown in FIGS. 6 and 7) the space 149, to the right of shiftable valve seat 142, is connected with passage 95 via passage 151, port 148, plunger groove 154, port 147, annular groove 133, and inlet passage 115. The pressure in space 149 acts against the right face of seat 142 and causes this seat to compress, and therefore preload, spring 146. On the other hand, when solenoid 158 is deenergized and spring 157 moves plunger 152 to the FIG. 5 position, the space 149 is vented to sump 97 via passage 151, port 148, plunger grooves 153, passages 161, chamber 162, exhaust passage 118, and passage 121. Thus, depending on whether solenoid 158 is energized or deenergized, the compensator group will establish either the higher or the lower maximum discharge pressure.

When the discharge pressure effective in passage 132 produces a pressure force on the left end of valve plunger 134 sufficient to overcome the bias of spring 146, this valve plunger moves to the right to a lap position in which plunger land 136 interrupts communication between ports 129 and 131. For convenience, the pressure required to hold valve plunger 134 in this lap position against the bias of spring 146 will be called the "reference pressure." When discharge pressure exceeds the "reference pressure," valve plunger 134 moves further to the right to thereby interconnect port 129 and passage 132 through slot 141 and plunger groove 138. Pressure fluid is now transmitted to the working chamber 74 of control motor 72 and through radial passages 145 and longitudinal passage 144 to spring chamber 143. When the pressure in these two chambers rises to a value at which the sum of the force of spring 146 and the pressure force acting on the right end of valve plunger 134 exceeds the pressure force acting on the left end of this plunger, the valve plunger will move to the left toward its lap position. When it has again reached the lap position, the pressures established in working chamber 74 and spring chamber 143 will be equal to the difference between discharge pressure in passage 95 and the "reference pressure." Further increases in discharge pressure produce equal increases in pressure in working chamber 74 and spring chamber 143.

The pressure in working chamber 74, acting on control piston 75, urges the cam plate 48 toward its neutral position against the bias of spring 71 and shifting motor piston 62. The parts are so dimensioned that when the discharge pressure in passage 95 reaches either of the two maximums, the cam plate 48 will be in its neutral position. The following numerical example will illustrate this point:

Let it be assumed that (1) The lower maximum discharge pressure is 3000 p.s.i. and the higher maximum discharge pressure is 4000 p.s.i.;

(2) The control pressure differential of cam plate 48 i.e., the difference in pressure in working chamber 74 which will cause cam plate 48 to move between its maximum and neutral positions, is 30 p.s.i.;

(3) The effective area of piston 75 of control motor 72 is 1 square inch;

(4) The effective area of piston 62 of shifting motor 59 is 0.495 square inch;

(5) Spring 71 exerts no force on cam plate 48 when the cam plate is in its maximum stroke establishing position; and (6) Spring 71 exerts a force of 15 pounds when cam plate 48 is in its neutral position.

Using these values and considering first the operation when solenoid 158 is deenergized and space 149 is vented, it will be seen that a pressure of 1500 p.s.i. will be required in working chamber 74 of control motor 72 in order to hold cam plate 48 in its neutral position when discharge pressure is 3000 p.s.i. Since the pressure in this working chamber equals the difference between discharge pressure and the "reference pressure," the "reference pressure" in this case must be 1500 p.s.i. This means that spring 146 will vent working chamber 74 until discharge pressure reaches 1500 p.s.i. and that when the discharge pressure exceeds this value, the pressure in that working chamber will increase at the same rate as the discharge pressure. When the discharge pressure reaches 2970 p.s.i., the pressure in working chamber 74 will have increased to 1470 p.s.i. and at this point the force developed by control motor 72 will just balance the sum of the forces developed by spring 71 and shifting motor 59. The next 30 p.s.i. increase in discharge pressure will cause control motor 72 to move the cam plate from its maximum to its neutral stroke establishing position. If discharge pressure should now decrease, valve plunger 134 will be shifted to the left from its lap position by spring 146 and the fluid pressure in spring chamber 143, thereby interconnecting ports 129 and 131 and venting working chamber 74. When the pressure in this chamber again equals the difference between discharge pressure and the "reference pressure," valve plunger 134 will again move to the right to its lap position. If discharge pressure should drop below the "reference pressure" of 1500 p.s.i., valve plunger 134 will take up a position to the left of its lap position.

When solenoid 158 is energized and the space 149 to the right of shiftable spring seat 142 is pressurized, this seat will move to the left and compress spring 146. The area of spring seat 142, which is subject to the pressure in space 149, is so selected that the preload induced in spring 146 will establish a "reference pressure" of 2005 p.s.i. Operation of the discharge pressure compensator under high pressure conditions is basically the same as it is under low pressure conditions. When discharge pressure is below the "reference pressure" of 2005 p.s.i., working chamber 74 is vented and when discharge pressure rises above this value, the pressure established in working chamber 74 equals the difference between discharge pressure and the "reference pressure." As a discharge pressure of 3970 p.s.i., the pressure in working chamber 74 will be 1965 p.s.i. and the force developed by control motor 72 will just balance the forces exerted by shifting motor 59 and spring 71. As the discharge pressure rises to 4000 p.s.i., the pressure in working chamber 74 will increase progressively to 1995 p.s.i. and the cam plate 48 will be moved gradually toward its neutral position. When discharge pressure reaches 4000 p.s.i., the force developed by control motor 72 will just balance the sum of the forces developed by spring 71 and shifting motor 59 and the cam plate 48 will be in its neutral position.

It should be observed that when the discharge pressure compensator establishes a maximum desirable pressure of 4000 p.s.i., spring seat 142 is subjected to two variable pressures, namely, the pressure in spring chamber 143 and the pressure in space 149. When discharge pressure is below 2005 p.s.i., the pressure in spring chamber 143 is zero and therefore the preload in spring 146 will depend only on discharge pressure which is the pressure in space 149. At a discharge pressure of 2005 p.s.i., the pressure differential across spring seat 142 tending to compress spring 146 is 2005 p.s.i. If discharge pressure rises to 3000 p.s.i., the pressure established in spring chamber 143 will be 995 p.s.i. and the pressure differential across spring seat 142 will still be 2005 p.s.i. At a discharge pressure of 4000 p.s.i., the pressure in spring chamber 143 will be 1995 p.s.i. and again, the pressure differential across spring seat 142 will be 2005 p.s.i. It is thus seen that although this spring seat is subjected to two variable pressures, the difference between these pressures is always the same once discharge pressure exceeds the "reference pressure."

The control pressure differential (in this example 30 p.s.i.) depends upon the rate of spring 71 and is independent of maximum discharge pressure. This is so because, when the hydraulic pump/motor unit is operating as a pump, annular spring seat 66 is in contact with cap 67, as shown in FIGS. 1 and 7. Therefore, even though the pressure in space 68 varies, this variation has no effect on the load in spring 71 when the engine operates as a pump. Spring plunger 57, of course, also has some effect on the control pressure differential but, as will appear below, the spring associated with this plunger is a light one so its effect can be neglected.

As pointed out in Tadeusz Budzich application Serial No. 763,101, filed September 24, 1958, now Patent No. 3,063,381, it is essential that the rate of biasing spring 71 be as low as practicable and that this spring exert a relatively large force when the cam plate is in its neutral position so that the cam plate will be moved rapidly toward its maximum stroke establishing position when discharge pressure drops below the desired maximum. These two requirements impose conflicting demands on the spring 71 and the application referred to above discloses a device for eliminating this compromise. The shifting motor 59 of the present invention functions not only to shift the cam plate to its neutral position at or before the time of reversal of direction of torque transmission, but also to perform the compromise-eliminating function of the device of that application. Because of the presence of this motor 59 during the pumping operation, the magnitude of the forces acting on the cam plate 48 to move it between its neutral and maximum stroke establishing positions can be selected without regard to spring 71. Thus this hydraulic unit, when operating as a pump, is capable of affording small control pressure differentials and high speed response characteristics.

Another feature of this device which deserves special attention is the shiftable annular spring seat 66. In the absence of this type of spring seat, the length of spring 71 would be double its present length and the load in this spring, when the cam plate is in its maximum stroke establishing position on the motoring side of neutral, would be relatively large. Under these conditions, the spring of spring plunger 57 would necessarily be large in order to move the cam plate to, and hold it in, that stroke establishing position. In the present pump/motor unit, since the seat for spring 71 is shiftable, the preload in spring 71 (when the cam plate is in its maximum stroke establishing position on the motoring side of neutral) can be eliminated completely or at least reduced to a very small value. It is for this reason that, as mentioned above, the spring of spring plunger 57 can be a light one.

*Operation*

For purposes of description, let it be assumed that the vehicle has two propulsion engines and that each is provided with the starter unit shown in FIG. 1 and the control valve 113, governor 112 and distributing valve 91 shown in FIG. 5. The splined couplings 78 and the centrifugal governors 112 are connected with the associated internal combustion engines and the components of each starting device are interconnected in the manner shown in FIG. 5. It will also be assumed that the first engine to be started is the one associated with the illustrated starter device and that that starter device will supply the motive fluid for starting the second internal combustion engine.

The passage 94 of this device is connected with a pump 163 via selector valve 164 and passage 165. The pump 163 supplies the 4000 p.s.i. motive fluid for starting the first engine and it can be mounted in or external to the vehicle. Selector valve 164 has a "start" position in which passages 165 and 94 are interconnected and a "pump" position in which passages 94 and 166 are interconnected. The passage 166 leads to the vehicle hydraulic system and in this case, that system includes the hydraulic pump/motor unit associated with the second propulsion engine.

Prior to the starting operation, the parts of the starting device assume the positions shown in FIG. 5. The working chamber 63 of shifting motor 59 is vented to sump 97 via passage 89, port 92, annular chamber 99, plunger groove 104, annular chamber 102, port 96, and passage 98. Because of the presence of passage 69 which interconnects working chamber 63 and the space 68 to the right of annular valve seat 66, this space is also vented thereby removing the preload in spring 71. Under these conditions, spring plunger 57 moves cam plate 48 to the maximum stroke establishing position on the motoring side of neutral. The working chamber 74 of control motor 72 is vented to sump 97 by control valve 113 along a path comprising passage 114, motor passage 116, port 129, plunger groove 139, port 131, and exhaust passage 117. The space 149, to the right of shifting valve seat 142, is vented by the solenoid-operated valve plunger 152 along a path comprising passage 151, port 148, plunger groove 153, passages 161, chamber 162, and exhaust passage 118.

When it is desired to start the first propulsion engine, solenoid 158 is energized to shift valve plunger 152 to the FIG. 6 position and the selector valve 164 is simultaneously shifted to its "start" position. Pressure fluid delivered by pump 163 is now transmitted to the high pressure port 28 of the hydraulic engine via passages 165, 94 and 95. In the manner described above, the fluid passing through the hydraulic unit from high pressure port 28 to low pressure port 29 causes rotation of the rotating group and produces the starting torque for the internal combustion engine. A portion of the fluid in passage 95 flows to the space 149 of control valve 113 via inlet passage 115, annular groove 133, port 147, plunger groove 154, port 148 and passage 151. The pressure in space 149, acting on the right face of spring seat 142, shifts this seat to the left thereby compressing spring 146 and causing it to establish a "reference pressure" of 2005 p.s.i. Although at this point in the operation the pressure in working chamber 74 may be as high as 1,995 p.s.i., the control motor 72 will not be effective to vary the displacement of the unit because this motor can move the cam plate 48 only in the clockwise direction and the cam plate has already reached the limit of movement in that direction.

Once the internal combustion engine has started and has reached the "starter cut-out" speed, the balls of centrifugal governor 112 will move to their outermost position thereby causing actuator 111 to shift distributing valve plunger 103 to the left to the position shown in FIG. 7. Pressure fluid in passage 94 can now flow to working chamber 63 of shifting motor 59 via port 93, annular chamber 101, plunger groove 105, annular chamber 99, port 92, and passage 89. At the same time, pressure fluid flows through passage 69 to the space 68 to the right of annular spring seat 66. Piston 62 and seat 66 (acting through spring 71) now move the cam plate 48 toward its neutral position. Since the angular position of the cam plate determines the length of the stroke of pistons 45, this movement of the cam plate reduces the dislacement of the hydraulic engine and consequently increases the pressure in passages 94 and 95. As a result, the shifting force exerted by piston 62 and spring 71 will increase as the cam plate moves to the neutral position and, in the absence of the discharge pressure compensator, these forces would cause the cam plate to over-shoot the neutral position. However, in the present device, as the pressure in passage 95 rises so too does the pressure which control valve 113 establishes in control motor working chamber 74. Since the area of piston 72 is twice the area of piston 62 and since once the "reference pressure" is exceeded the rate of change of pressure in working chamber 74 equals the rate of change of pressure in working chamber 63, it is seen that the force developed by control motor 72 which resists movement of the cam plate increases at a faster rate than the shifting forces of piston 66 and spring 71. The cam plate then is moved to neutral with a progressively decreasing force and over-shoot is minimized. When the cam plate 48 reaches neutral, the pressures in passages 95 and in working chamber 63 will be 4000 p.s.i., and the pressure in working chamber 74 will be 1,995 p.s.i. Because of this, the force developed by motor 72 will just balance the sum of the forces developed by spring 71 and motor 59 and the cam plate will come to rest in the neutral position.

During the movement of cam plate 48 toward its neutral position, the motoring speed of the hydraulic pump/motor unit decreases until, when the cam plate is within a few degrees of neutral, all motoring operation stops. At this point, power shaft 77, which is driven by the internal combustion engine, will commence to drive shaft 32 through clutch 85 and spur gears 81 and 87; the cam elements 88 of clutch 84 now being overrun. It is thus seen that at the time the direction of torque transmission between the starting device and the engine is reversed, the stroke of the pistons and consequently the magnitude of the torque will be small. Because of this, the transition from motoring to pumping operation is smooth. Furthermore, since the cam 48 will be held in its neutral position, a minimum load will be imposed on the internal combustion engine by the starter device and therefore that engine can accelerate rapidly to its idling speed.

When the internal combustion engine is idling, selector valve 164 is shifted to its "pump" position so that motive fluid can be supplied to the starting device of the second propulsion engine. Shifting of selector valve 164 to this position produces a decrease in pressure in passages 94 and 95 and this change in pressure is immediately effective in the passage 132 of control valve 113. The pressure in spring chamber 143, together with the force developed by spring 146, shifts valve plunger 134 to the left from its lap position, thereby connecting ports 129 and 131 through groove 139 to vent working chamber 74 of control motor 72. The pressures in working chamber 74 and in spring chamber 143 will decrease, and as they do, spring 71 and motor piston 62 will move the cam plate 48 toward its maximum stroke establishing position on the pumping side of neutral. When the pressure in working chamber 74 is below 1965 p.s.i., the cam plate will be in that stroke establishing position.

When the second propulsion engine has been started and the displacement of its starter device decreases, the pressures in passages 94 and 95 will increase and control valve 113 will again serve to progressively increase the pressure in working chamber 74 of control motor 72. Cam plate 48 will be moved back toward its neutral position and when the pressure in passages 94 and 95 reaches 4000 p.s.i., the cam plate will be in its neutral position. After both propulsion engines have reached their idling speeds, the solenoid 158 of each starter device will be de-energized to thereby allow spring 157 to shift valve plunger 152 to its FIG. 5 position. This action vents space 149 to the right of spring seat 142 and allows spring 146 to move that seat to the right into contact with plug 123. Control valve 113 will now function to limit discharge pressure to 3000 p.s.i.

It should be observed that the shaft 32 and cylinder barrel 33 rotate in the same direction regardless of whether the starting device is functioning as a pump or as a motor and that, therefore, port 28 is always the high pressure port. This is an advantage because it permits the use of lighter weight hydraulic tubing on the low pressure side of the starting device.

FIGS. 8 and 9 illustrate a planetary gear torque-transmitting device which may be used in place of the spur gears 79, 81, 86 and 87 and the overrunning clutches 84 and 85 of the FIG. 1 embodiment. For convenience, parts performing similar functions in the two embodiments will be designated by the same reference numeral.

As shown in FIG. 8, the housing section 22 is bored to receive a wall 167 which is held in place by suitable bolts (not shown). The drive shaft 32 is journalled in a bearing which is mounted in this wall and the left end of the drive shaft carries an integral sun gear 168. Encircling the axis of rotation are two longitudinally spaced planet carriers 169 and 171 having outstanding flanges 172 and 173 which are journalled on their outer peripheries in antifriction bearings 174 and 175. These bearings 174 and 175 are mounted, respectively, in wall 167 and in housing section 21. Extending between and supported in planet carriers 169 and 171 are three shafts 176 which are spaced around the axis of rotation at 120° intervals. A planet gear 177 is mounted on each shaft 176 and these gears are positioned in engagement with sun gear 168. Encircling the planet gears 177 is a ring gear 178 which engages the planets and is formed, on its outer periphery, with longitudinal splines 179. A power shaft 181 extends into an axial bore 182 formed in drive shaft 32 and is connected with the drive shaft 32 by a one-way overrunning clutch 183. The power shaft 181 is formed with an annular shoulder 184 which, together with bolts 185, forms a rigid connection between the power shaft and planet carrier 171.

Mounted on the outer periphery of ring gear 178 are three longitudinally spaced annular plates 186; each of these plates having a plurality of splines 187 which mate with the splines 179 formed on the ring gear. The plates 186 are interleaved between similar plates 188 which are splined on their outer peripheries to the housing section 21. The plates 186 and 188 are the operative elements of a friction clutch. Two annular bearing plates 189 and 190 are mounted in similarly formed bores in housing sections 22 and 21 and are located on opposite sides of the clutch plates 186 and 188. A circular series of eight cylinder bores 191 is formed in housing section 21 and these bores open against the outer face of bearing plate 190. Reciprocable pistons 192 are mounted in cylinder bores 191 and are in operative engagement with the bearing plate 190 through balls 193 and shoes 194. The left ends of the bores 191 are counterbored (as shown in FIG. 8) to define motor working chambers 195. The housing section 21 is provided with an inlet port 196 which communicates with one of the working chambers 195 and this working chamber is interconnected with the other seven chambers by passage 197.

The planetary transmission of FIGS. 8 and 9 serves to provide a direct connection between shafts 181 and 32 through clutch 183, when the hydraulic unit is driving the internal combustion engine in the direction of the arrow of FIG. 9. When the internal combustion engine is driving the hydraulic unit, clutch 183 will be overrun and torque will be transmitted from shaft 181 to drive shaft 32 through planet gears 177 and sun gear 168. However, it should be noted that torque can be transmitted in this direction only if the friction clutch, defined by plates 186 and 188, is engaged so that ring gear 178 is prevented from rotating. The friction clutch actuating motor, comprising cylinder bores 191, pistons 192 and working chambers 195, functions, when pressurized, to move the plates 186 and 188 into engagement. The control system illustrated in FIG. 10 includes a device for alternatively pressurizing and venting the friction clutch actuating motor.

The control system of FIG. 10 is the same as that shown in FIG. 5 except for the inclusion of the distributing valve 198. This valve comprises a housing having a valve bore which is encircled by three longitudinally spaced annular chambers 199, 201 and 202 which are connected by passages 203, 204 and 205, respectively, with the passage 94, the clutch motor port 196 and the sump 97. Slidable in the bore of valve 198 is a plunger 206 formed with two annular grooves 207 and 208 which define three spaced annular lands 209, 211 and 212. The left end of the valve plunger carries an enlarged head 213 which reciprocates in the bore 214 formed in spring plunger 57. A spring 215 reacts against the enlarged head 213 and biases the valve plunger 206 to the position shown in FIG. 10. It will be observed that the end wall 216 of the bore 214 is spaced from the head 213 when the cam plate 48 is in its maximum stroke establishing position on the motoring side of neutral. Head 213 and wall 216 define a lost motion connection between the cam plate 48 and distributing valve plunger 206 and this connection is so designed that groove 207 will begin to connect annular chamber 199 with annular chamber 201 when the cam plate reaches its neutral position and will maintain this interconnection when the cam plate is on the pumping side of neutral.

During the starting operation, high pressure fluid delivered to port 28 causes the hydraulic pump/motor unit to drive the internal combustion engine through shaft 32, clutch 183, power shaft 181, and splined coupling 78. The working chambers 195 of the clutch actuating motor are vented to sump 97 by port 196, passage 204, annular chamber 201, plunger groove 208, annular chamber 202, and passage 205, and therefore the clutch plates 186 and 188 will be disengaged. Because of this, sun gear 168, planet carriers 169 and 171, ring gear 178, and plates 186 will revolve together; there will be no relative motion between any of these parts.

When the "starter cut-out" speed has been reached, centrifugal governor 112 shifts the plunger 103 of distributing valve 91 to the position in which inlet and outlet ports 93 and 92 are connected and the working chamber 63 of the shifting motor 59 is pressurized. As explained previously, in connection with the FIG. 1 embodiment, the cam plate 48 now moves toward its neutral position. As this movement progresses, wall 216 of spring plunger 57 moves into contact with head 213 and plunger 206 is shifted to a position in which land 211 interrupts communication between annular chambers 201 and 202. When the cam plate 48 reaches its neutral position, plunger 206 will have been shifted to a position in which groove 207 begins to interconnect annular chambers 199 and 201. Pressure fluid in passage 94 will now flow through passages 203 and 204 and port 196 to the working chambers 195 of the friction clutch actuating motor. Under the action of the pressure in these working chambers, pistons 192, acting through balls 193, shoes 194 and bearing plate 190, will press the interleaved clutch plates 186 and 188 into engagement. Ring gear 178, therefore, will be held stationary and the internal combustion engine will commence to drive the starter device through power shaft 181, planet carriers 169 and 171, planet gears 177, sun gear 168, and drive shaft 32. If the cam plate 48 should now move over to its pumping side of neutral (as a result of a decrease in pressure in passage 94), the groove 207 of valve 198 will still connect annular chambers 199 and 201 so that the clutch actuating motor will continue to be energized.

This embodiment of the invention affords several advantages which are worthy of special consideration. In the first place, since the friction clutch defined by clutch plates 186 and 188 is a yielding rather than a positive connection, damage from overload will be minimized. Furthermore, this arrangement guarantees that no torque will be transmitted from the internal combustion engine to the rotating group of the starting device while the cam plate is on the motoring side of neutral. This feature is important for two reasons. First, it will be remembered that, in connection with the discussion of the FIG. 1 embodiment, it was stated that when the cam plate is within a few degrees of neutral on the motoring side, motoring operation ceases. With the spur gear drive of FIG. 1, torque can be transmitted from the internal combustion engine to the starter device even though the cam plate is still several degrees away from neutral. This means that the reversal of direction of torque transmission does not occur at the time the magnitude of the torque is a minimum. In the FIGS. 8 through 10 embodiment, on the other hand, the lost motion connection between cam plate 48 and distributing valve 198 can be designed to ensure that the friction clutch actuating motor will not be pressurized until the cam plate is actually in its neutral position. Therefore, this arrangement affords a smoother transition from motoring to pumping operation.

The second reason relates to safety considerations. In the FIGS. 1–7 embodiment, if either the centrifugal governor 112 or the distributing valve 91 fails to operate at the "starter cut-out" speed, the cam plate 48 will remain on the motoring side of neutral even though the hydraulic pump/motor unit is being driven by the internal combustion engine. As a result, the hydraulic unit will operate as a pump and discharge high pressure fluid from port 29. Since the sump 97 is connected with this port, the reversal of the functions of ports 28 and 29 could cause serious damage. In the FIGS. 8–10 embodiment, this condition cannot occur because torque is not transmitted from the internal combustion engine to the hydraulic unit unless the friction clutch actuating motor is pressurized and that motor will not be pressurized until cam plate 48 reaches its neutral position.

In the two embodiments of the invention described thus far, the reversal of the direction of torque transmission between the starter device and the internal combustion engine is synchronized, or approximately synchronized, with the movement of the cam plate into its neutral position. In some internal combustion engines, particularly those of the turbo-jet or jet propulsion type, the amount of excess power available to accelerate the engine from the "starter cut-out" speed to the idling speed is quite small. Even though, in the embodiments just described, the magnitude of the torque transmitted between the engine and the starter is small at the time of reversal of direction of torque transmission, it may, in these engines, unduly retard the acceleration rate. Where high engine acceleration is an important consideration, the embodiment shown in FIGS. 11 and 12 is superior.

The FIG. 11 embodiment is similar to the embodiment of FIGS. 8–10 in that it also employs a planetary gear transmission and a governor operated distributing valve 91. However, in this embodiment, the friction clutch actuating motor is not pressurized until the engine attains its idling speed or at least until it reaches a speed substantially higher than "starter cut-out" speed. As shown in FIG. 11, the control system of this embodiment includes a centrifugal governor-operated distributing valve 91′ which, except for the spring 109′, is identical to the distributing valve 91. The inlet, outlet and exhaust ports 93′, 92′ and 96′ are connected with passage 89, friction clutch motor port 196, and sump 97 by passages 217, 218 and 219, respectively. Spring 109′ is so selected that governor actuator 111′ will shift valve plunger 103′ to a position in which ports 92′ and 93′ are interconnected when the internal combustion engine has reached its idling speed.

During motoring operation, pressure fluid is supplied by passage 94 to distributing valve 91. When the "starter cut-out" speed has been reached, actuator 111 of governor 112 shifts valve plunger 103 to the left against the bias of spring 109 so that fluid pressure is transmitted to the working chamber 63 of shifting motor 59 and to the inlet port 93′ of distributing valve 91′. Motor 59 and spring 71 now move cam plate 48 toward its neutral position in the manner previously described and, when power shaft 181 begins to overrun drive shaft 32, clutch 183 in the planetary transmission will disengage. However, torque will not be transmitted from the internal combustion engine to the starter at this time because the friction clutch actuating motor is vented via port 196, passage 218, port 92′, annular chamber 99′, plunger groove 104′, annular chamber 102′, port 96′, and passage 219.

The engine now accelerates under its own power and, when it reaches its idling speed, governor 112′ will shift plunger 103′ of distributing valve 91′ to the left to a position in which plunger groove 105′ interconnects annular chambers 99′ and 101′. Pressure fluid delivered to inlet port 93′ of distributing valve 91′ can now flow to the working chambers 195 of the friction clutch actuating motor via outlet port 92′ and passage 218. The pistons 192 now move the clutch plates 186 and 188 into engagement so that ring gear 178 will be held stationary and torque can be transmitted from the internal combustion engine to the hydraulic pump/motor unit through the planetary gear train. At the time the clutch plates 186 and 188 are moved into engagement, the cam plate 48 is in its neutral position. Because of this, no large shock loads will be imposed on the torque-transmitting device.

It should be observed that the safety feature of the FIGS. 8–10 embodiment is also present in this embodiment since the friction clutch actuating motor cannot be pressurized unless centrifugal governor 112 has first shifted distributing valve 91 to the position in which the working chamber 63 of shifting motor 59 is pressurized.

As stated previously, the drawings and description relate only to the preferred and several alternate embodiments of the invention. Since many changes can be made in these embodiments without departing from the inventive concept, the following claims should provide the sole measure of the scope of the invention.

What is claimed is:

1. An internal combustion engine; a hydraulic starting and pumping device for use with an internal combustion engine comprising a rotary cylinder barrel longitudinally reciprocating piston hydraulic pump/motor unit capable of operating as both a pump and a motor and having high and low pressure ports, a cam plate for moving the pistons on their discharge strokes and for governing the length of these strokes, and means supporting the cam plate for angular movement between maximum stroke establishing positions on opposite sides of a neutral zero stroke establishing position, the two sides being termed the motoring and pumping sides, respectively; bidirectional torque-transmitting means for connecting the hydraulic pump/motor unit with the internal combustion engine; resilient means biasing the cam plate toward its maximum stroke establishing position on the motoring side of neutral; shifting motor means for moving the cam plate toward its maximum stroke establishing position on the pumping side of neutral against the bias of the resilient means; and a device responsive to the speed of the internal combustion engine for energizing the shifting motor means when that engine reaches a certain speed.

2. The device defined in claim 1 in which the shifting motor means includes a shifting motor, a movable spring seat siftable in spring compressing and expanding directions, a compression spring reacting between the seat and the cam plate for biasing the cam plate toward its maximum stroke establishing position on the pumping side of neutral and a motor for moving the spring seat in the spring compressing direction; and including a control motor for moving the cam plate toward its maximum stroke establishing position on the motoring side of neutral against the bias of the shifting motor and the spring; and control means for energizing the control motor.

3. The device defined in claim 2 in which the spring seat motor and the shifting motor are energized simultaneously by the speed-responsive device.

4. The device defined in claim 2 in which the control means is responsive to the pressure in the high pressure port and energizes the control motor progressively as the pressure in that port rises above a predetermined value.

5. The device defined in claim 3 in which the spring seat motor, the shifting motor and the control motor are fluid pressure motors, each motor including a working chamber and a movable motor element subject to the pressure in that chamber and connected with the cam plate; and in which the speed-responsive device includes a rotational speed sensor and a shifting motor distributing valve shiftable by the sensor for connecting the working chambers of both the shifting motor and the spring seat motor with the high pressure port when the engine speed exceeds said certain speed and for interrupting this connection when the engine speed is below that speed; and the control means includes a control valve shiftable in response to the pressure in the high pressure port for venting the working chamber of the control motor when that pressure is below a predetermined value and when that pressure exceeds said predetermined value for varying the pressure in the working chamber progressively in accordance with the pressure in the high pressure port.

6. The device defined in claim 3 in which all three motors are fluid pressure motors, each including a working chamber and a movable motor element subject to the pressure in the working chamber and connected with the cam plate; and in which the speed-responsive device comprises: a shifting motor distributing valve having an inlet port connected with the high pressure port, an outlet port connected with the working chambers of both the spring seat motor and the shifting motor, a movable valve element shiftable between a first position in which the inlet and outlet ports are isolated from each other and a second position in which these ports are interconnected, resilient means biasing the valve element toward the first position, and a rotational speed sensor for shifting the valve element to the second position when said certain speed is reached; and the control means comprises: a control valve having an inlet port connected with the high pressure port, an exhaust port, an outlet port connected with the working chamber of the control motor, a movable valve element having a first position in which the outlet and exhaust ports are interconnected, a second position in which the inlet and outlet ports are interconnected and an intermediate lap position in which the outlet port is isolated from the other two ports, a spring biasing the valve element toward the first position, and a motor responsive to the difference between the pressures in the inlet and outlet ports for shifting the valve element toward the second position against the bias of the spring.

7. The device defined in claim 6 in which the biasing spring of the control valve is a compression spring, and which includes a seat for said spring shiftable in spring compressing and spring expanding directions; and a valve spring motor for moving the seat in the spring compressing direction.

8. The device defined in claim 6 in which the biasing spring of the control valve is a compression spring, and which includes a seat for said spring which is shiftable in spring compressing and spring expanding directions; two opposed movable abutments connected with said seat, one of said abutments being subject to the pressure in the working chamber of the control motor and urging the seat in the spring expanding direction; and selecting means for either venting the other abutment or subjecting it to the pressure in the high pressure port.

9. The device defined in claim 1 in which the bi-directional torque-transmitting means comprises first means for transmitting torque from the hydraulic pump/motor unit to the internal combustion engine; second means for transmitting torque from the internal combustion engine to the hydraulic pump/motor unit; a clutch associated with the second means for controlling its torque-transmitting ability, said clutch when engaged permitting the transmission of torque and when disengaged preventing such transmission; and clutch-actuating means responsive to the speed of the internal combustion engine for disengaging the clutch when engine speed is below a predetermined speed and for engaging the clutch when engine speed exceeds said predetermined speed.

10. The device defined in claim 9 in which the clutch-actuating means comprises the speed-responsive device; the shifting motor means; the cam plate; a clutch motor for engaging the clutch; and a clutch motor energizing device operatively connected with the cam plate for de-energizing the clutch motor when the cam plate is on the motoring side of neutral and for energizing that motor when the cam plate is on the pumping side of neutral.

11. The device defined in claim 10 in which the clutch motor is a fluid pressure motor having a working chamber and a movable element subject to the pressure in that chamber and arranged to engage the clutch; and the clutch motor energizing device comprises a clutch motor distributing valve having an inlet port connected with the high pressure port, an outlet port connected with the working chamber of the clutch motor, and a movable valve element shiftable by the cam plate for interconnecting the inlet and outlet ports when the cam plate is on the pumping side of neutral and for isolating these ports from each other when the cam plate is on the motoring side of neutral.

12. The device defined in claim 9 in which the predetermined speed is higher than the certain speed.

13. The device defined in claim 12 in which the clutch-actuating means comprises a clutch motor for engaging the clutch; means interconnecting the clutch motor and the speed-responsive device so that the former may be energized by the latter; and a second speed-responsive device interposed between said speed-responsive device and the clutch motor for preventing energization of that motor until the internal combustion engine reaches said predetermined speed.

14. The device defined in claim 5 in which the bi-directional torque-transmitting means comprises first means for transmitting torque from the hydraulic pump/motor unit to the internal combustion engine; second means for transmitting torque from the internal combustion engine to the hydraulic pump/motor unit; a clutch associated with the second means for controlling its torque-transmitting ability, said clutch when engaged permitting the transmission of torque and when disengaged preventing such transmission; a fluid pressure clutch motor having a working chamber and a movable motor element subject to the pressure in that chamber for engaging the clutch; a clutch motor distributing valve having an inlet port connected with the high pressure port, an outlet port connected with the working chamber of the clutch motor, and a movable valve element shiftable between a first position in which these ports are isolated from each other and a second position in which these ports are interconnected; and valve-operating means interconnecting the valve element of the clutch motor distributing valve and the cam plate in such manner that when the cam plate is on the motoring side of neutral the valve element is in said first position and when the cam plate is on the pumping side of neutral the valve element is in said second position.

15. The device defined in claim 5 in which the bi-directional torque-transmitting means comprises first means for transmitting torque from the hydraulic pump/motor unit to the internal combustion engine; second means for transmitting torque from the internal combustion engine to the hydraulic pump/motor unit; a clutch associated with the second means for controlling its torque-transmitting ability, said clutch when engaged permitting the transmission of torque and when disengaged preventing such transmission; a fluid pressure clutch motor having a working chamber and a movable motor element subject to the pressure in that chamber for engaging the clutch; a clutch motor distributing valve having an inlet port connected with the working chamber of the shifting motor, an outlet port connected with the working chamber of the clutch motor, and a movable valve element shiftable between a first position in which these ports are isolated from each other and a second position in which these ports are interconnected; and a valve actuator connected with the valve element of the clutch motor distributing valve and responsive to the speed of the internal combustion engine for moving said valve element to the first position when the engine speed is below a predetermined speed higher than said certain speed and to the second position when the speed is above the predetermined speed.

16. The method of accelerating an engine to starter cut-out speed during a starting cycle and generating hydraulic pressure using a variable displacement motor-pump unit comprising supplying fluid under pressure to the unit to cause it to operate as a motor; regulating the displacement of the unit so that the unit delivers torque to the engine and accelerates it to the starter cut-out speed; reducing the displacement of the unit toward zero as the engine reaches cut-out speed; terminating the supply of fluid under pressure to the unit; and reversing the direction of flow through the unit while maintaining unchanged its direction of rotation, whereby the unit functions as a pump driven by the engine.

17. The method defined in claim 16 in which the direction of flow through the unit is reversed after the engine reaches a speed substantially higher than cut-out speed.

18. The method defined in claim 16 in which the unit is operated at maximum displacement from the beginning of the starting cycle until the engine reaches cut-out speed.

19. The method defined in claim 16 including the step of varying the displacement of the unit in inverse relation to discharge pressure after the direction of flow through the unit has been reversed to thereby maintain discharge pressure substantially constant at a predetermined value.

20. The method defined in claim 16 including the step of varying the displacement of the unit in inverse relation to discharge pressure after the direction of flow through the unit has been reversed to selectively maintain discharge substantially constant at a selected one of several predetermined values.

21. The method of accelerating two engines to starter cut-out speed during a starting cycle in which at least one of the engines is provided with a variable displacement motor-pump unit, comprising the steps supplying fluid under pressure to the unit to cause it to operate as a motor; regulating the displacement of the unit so that the unit delivers torque to said one engine and accelerates it to its starter cut-out speed; reducing the displacement of the unit toward zero as said one engine reaches cut-out speed; terminating the supply of fluid under pressure to the unit; reversing the direction of flow through the unit while maintaining unchanged its direction of rotation, whereby the unit functions as a pump driven by said one engine; and utilizing the fluid discharged by the unit when it is functioning as a pump to drive and accelerate the second engine to its cut-out speed.

22. The method defined in claim 21 including the step of varying the displacement of the unit in inverse relation to the pressure of the fluid it discharges while functioning as a pump to maintain the discharge pressure substantially constant at a predetermined value.

23. The method defined in claim 22 in which the fluid discharged by the unit is utilized to drive the second engine only after the first engine has reached a speed substantially higher than its cut-out speed.

24. The method defined in claim 21 including the steps of varying the displacement of the unit in inverse relation to the pressure of the fluid it discharges while functioning as a pump to maintain the discharge pressure substantially constant at a first value during the starting cycle of the second engine; and thereafter varying the displacement of the unit in inverse relation to the pressure of the fluid it discharges to maintain the discharge pressure substantially constant at a second value lower than said first value.

References Cited in the file of this patent
UNITED STATES PATENTS
2,802,452   Hogeman _____ Aug. 13, 1957